United States Patent
Weber et al.

(10) Patent No.: US 9,434,346 B2
(45) Date of Patent: Sep. 6, 2016

(54) AIRBAG MODULE WITH AN ADAPTIVE VENTILATION DEVICE

(71) Applicant: Autoliv Development AB, Vårgårda (SE)

(72) Inventors: Marcus Weber, Untertheres (DE); Jens Hoffmann, Aschaffenburg (DE); Raimund Nebel, Obermeitingen (DE); Wolfgang Drössler, Gröbenzell (DE); Roland Peiz, Hilgertshausen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/647,150

(22) PCT Filed: Nov. 21, 2013

(86) PCT No.: PCT/EP2013/074333
§ 371 (c)(1),
(2) Date: May 26, 2015

(87) PCT Pub. No.: WO2014/082912
PCT Pub. Date: Jun. 5, 2014

(65) Prior Publication Data
US 2015/0314747 A1 Nov. 5, 2015

(30) Foreign Application Priority Data

Nov. 28, 2012 (DE) .................... 10 2012 023 226

(51) Int. Cl.
*B60R 21/239* (2006.01)
*B60R 21/2165* (2011.01)
*B60R 21/26* (2011.01)

(52) U.S. Cl.
CPC ......... *B60R 21/239* (2013.01); *B60R 21/2165* (2013.01); *B60R 21/26* (2013.01); *B60R 2021/2395* (2013.01)

(58) Field of Classification Search
CPC . B60R 21/239; B60R 21/2165; B60R 21/26; B60R 2021/2395
USPC .......................................... 280/729
See application file for complete search history.

(56) References Cited

U.S. PATENT DOCUMENTS 6,616,184 B2 * 9/2003 Fischer ................. B60R 21/205
280/735
6,648,371 B2 * 11/2003 Vendely ................ B60R 21/217
280/739

(Continued)

FOREIGN PATENT DOCUMENTS

DE     10 2005 039 418 A1    3/2007
DE     10 2006 051 552 A1    5/2008

(Continued)

OTHER PUBLICATIONS

PCT International Search Report—Mar. 4, 2014.

(Continued)

*Primary Examiner* — Faye M Fleming
(74) *Attorney, Agent, or Firm* — Brinks Gilson & Lione

(57) ABSTRACT

An airbag module having a first nozzle (10) enclosing a first gas compartment (G1), and a first inflator. At least one adaptive ventilation device for the first gas compartment (G1) is provided with a ventilation opening (12) bordered by flexible material and at least one throttle device with a tear seam, which, in a first state, throttles the gas flow more strongly than in a second state. A second cover (44) surrounding a second gas compartment (G2) and a gas source for the second gas compartment (G2) are provided, wherein the tear seam (49) extends through the second gas compartment and, upon filling of the second gas compartment (G2) by the gas source, the seam ruptures and the adaptive ventilation device passes from the first, to the second state.

15 Claims, 12 Drawing Sheets

(56) References Cited

U.S. PATENT DOCUMENTS

| | | | | |
|---|---|---|---|---|
| 7,240,917 B2* | 7/2007 | Fogle, Jr. | ............... | B60R 21/276 280/739 |
| 7,347,450 B2 | 3/2008 | Williams et al. | | |
| 7,448,646 B2* | 11/2008 | Hall | ................... | B60R 21/2338 280/739 |
| 7,552,942 B2* | 6/2009 | Fischer | ............... | B60R 21/2338 280/734 |
| 7,614,652 B2 | 11/2009 | Aoki | | |
| 7,614,654 B2 | 11/2009 | Williams | | |
| 7,722,080 B2 | 5/2010 | Rose et al. | | |
| 7,748,732 B2 | 7/2010 | Sella et al. | | |
| 7,789,423 B2* | 9/2010 | Kim | ..................... | B60R 21/233 280/743.2 |
| 7,845,678 B2* | 12/2010 | Pausch | ................ | B60R 21/2338 280/735 |
| 8,322,748 B2* | 12/2012 | Abe | ................... | B60R 21/2338 280/730.2 |
| 8,608,197 B2* | 12/2013 | Eckert | .................. | B60R 21/239 280/728.2 |
| 2004/0017069 A1* | 1/2004 | Fischer | ................ | B60R 21/233 280/739 |
| 2004/0256845 A1 | 12/2004 | Damm | | |
| 2006/0071461 A1 | 4/2006 | Williams et al. | | |
| 2006/0290117 A1* | 12/2006 | Fischer | ............... | B60R 21/2338 280/739 |
| 2009/0309341 A1 | 12/2009 | Pausch | | |
| 2011/0148085 A1 | 6/2011 | Fukawatase et al. | | |
| 2012/0292897 A1 | 11/2012 | Puzzonia | | |
| 2015/0115580 A1* | 4/2015 | Gould | ................. | B60R 21/2176 280/730.1 |
| 2015/0239424 A1* | 8/2015 | Nebel | ................. | B60R 21/2338 280/729 |

FOREIGN PATENT DOCUMENTS

| | | |
|---|---|---|
| DE | 10 2008 028 389 A1 | 12/2009 |
| DE | 10 2008 039 675 A1 | 3/2010 |
| DE | 10 2009 055 266 A1 | 6/2011 |
| DE | 10 2011 015 309 A1 | 10/2012 |
| JP | 11-321506 | 11/1999 |
| WO | WO 2011/157631 A1 | 12/2011 |
| WO | WO 2012/130445 A1 | 10/2012 |

OTHER PUBLICATIONS

German Examination Report—Jul. 15, 2013.
PCT International Search Report—Nov. 21, 2013.
German Examination Report—Aug. 9, 2013.

\* cited by examiner

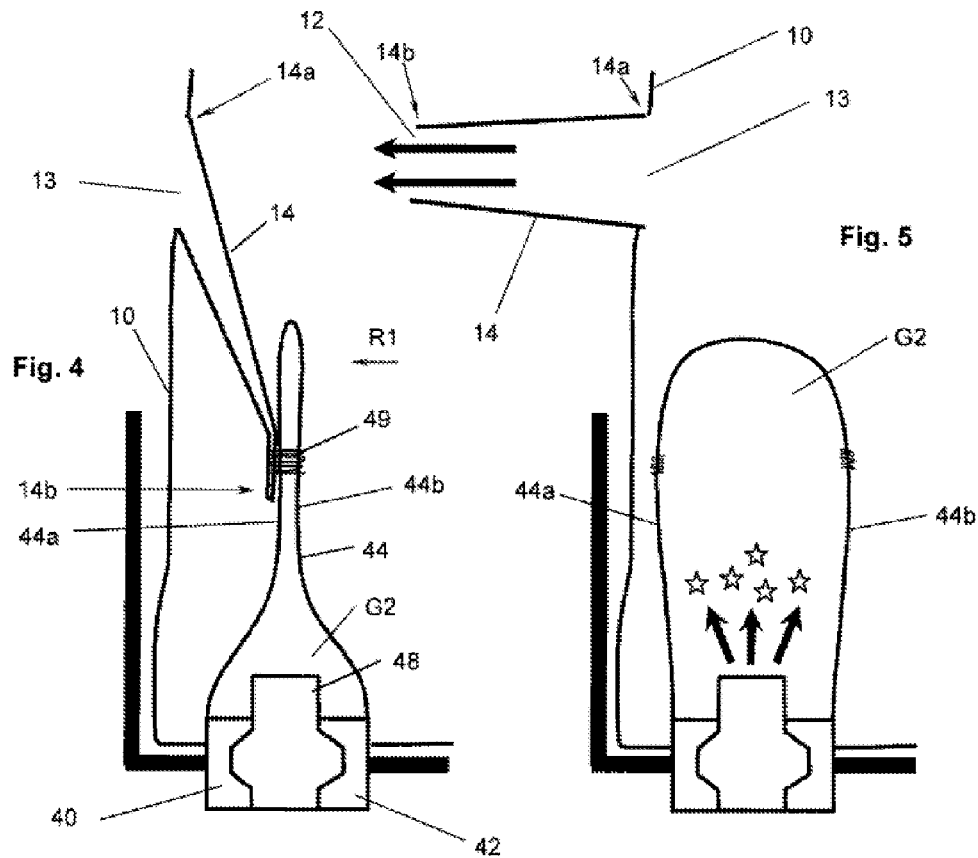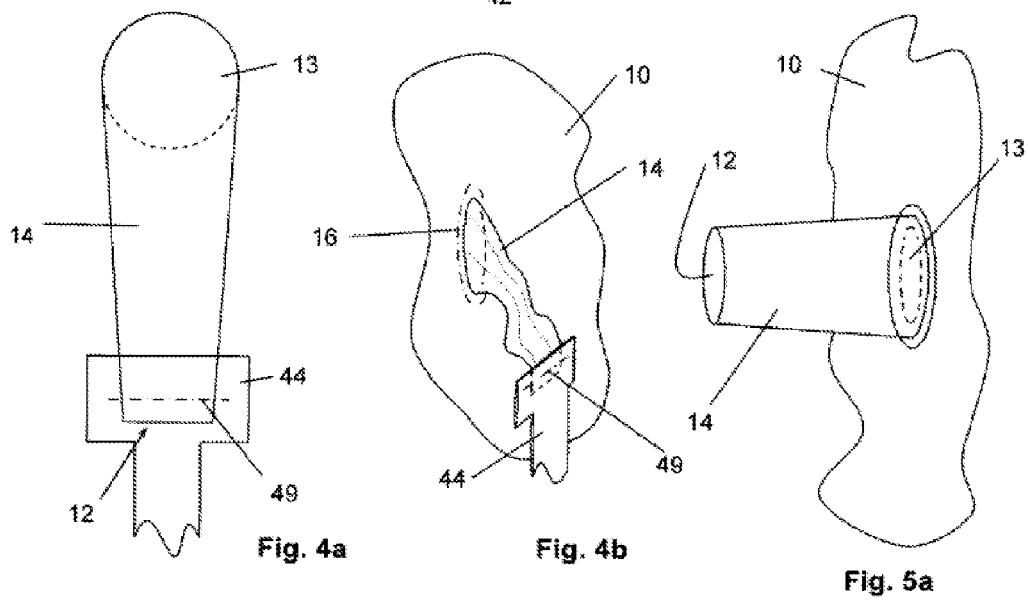

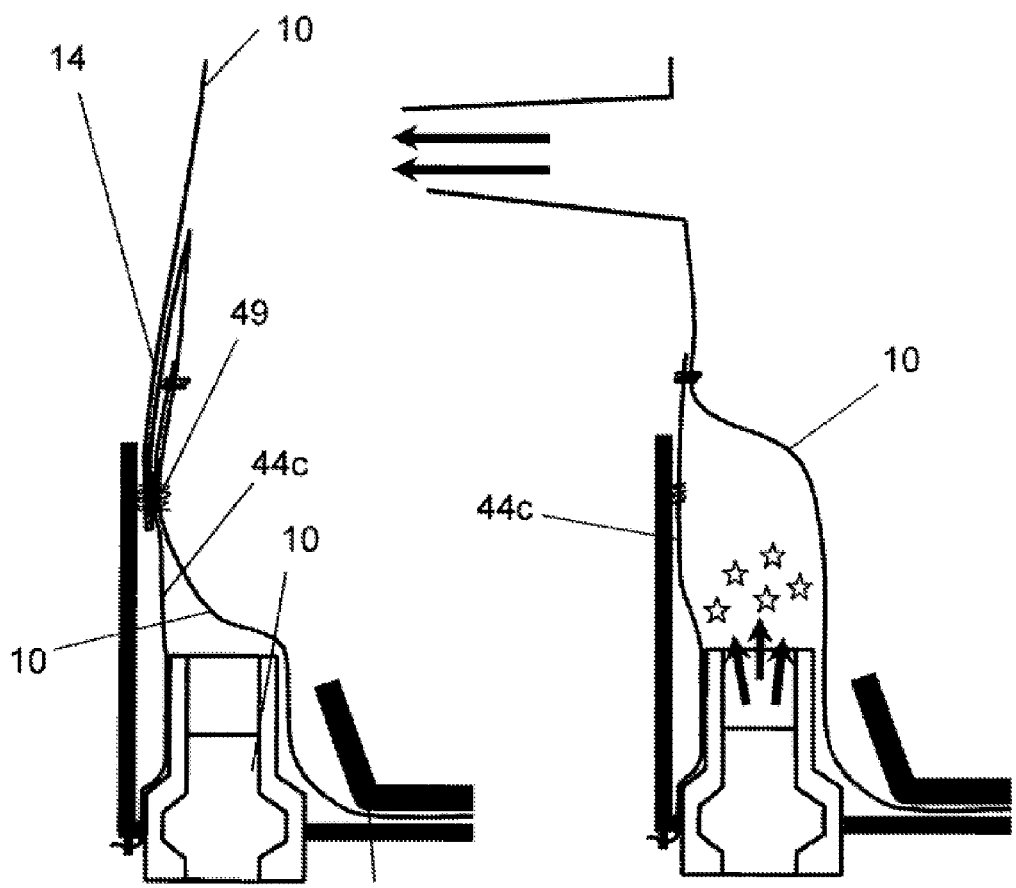
Fig. 12                    Fig. 13

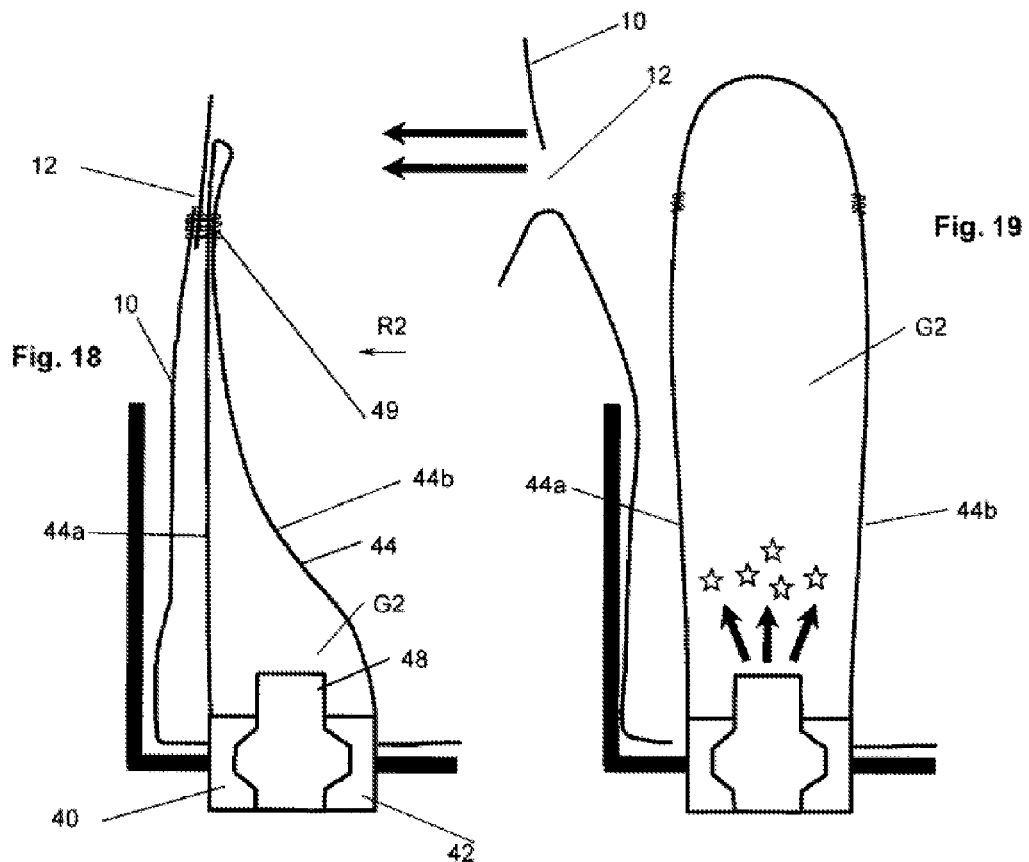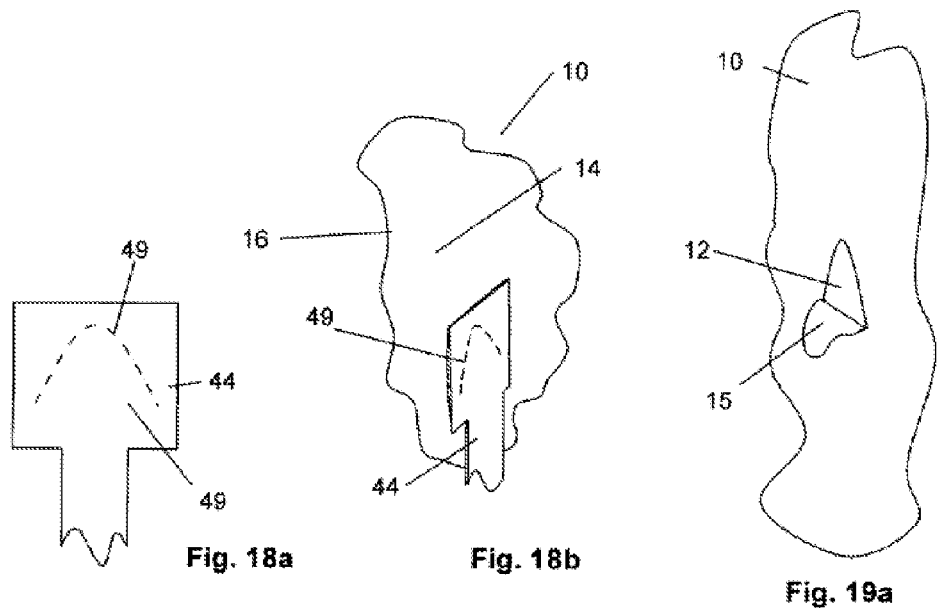

AIRBAG MODULE WITH AN ADAPTIVE VENTILATION DEVICE

CROSS REFERENCE TO RELATED APPLICATIONS

This application claims priority to German Patent Application No. 10 2012 023 226.8, filed on Nov. 28, 2012, and PCT International Patent Application No. PCT/EP2013/074333, filed on Nov. 21, 2013.

FIELD OF THE INVENTION

The invention relates to an airbag module for motor vehicle applications with an adaptive ventilation device.

BACKGROUND

Nearly every airbag, in particular every front-seat airbag, features a ventilation device through which gas from the gas compartment surrounding the outer cover of the airbag—hereinafter called the first gas compartment—can escape when it impinges on the person to be protected, so that the kinetic energy of the person to be protected is dissipated and said person will not be simply thrown back by the cover of the airbag. In the simplest case, such a ventilation device is simply a ventilation opening, in particular, a ventilation opening in the airbag cover.

In order to take account of different accident situations and/or of the weight of the person to be protected, adaptive ventilation devices are also known from prior art, which in addition to the ventilation opening also feature a throttle device, which, in a first state, throttles the gas flow through the ventilation opening more strongly than in the second state. Generally, the first state is the initial state, and the second state is the optional end state. A throttle device of this kind can in a simple case consist of a flap acting as throttle element and of a tear seam, so that the flap is sewn around the ventilation opening together the first cover: If the pressure in the first gas compartment exceeds a predefined value, then the tear seam bursts and the flap releases the ventilation opening.

It has also been known to provide an actuation unit, which in response to an external signal, in particular to an external electrical signal, changes the throttle device from its first state into its second state. For example, an actuator in the form of a pyrotechnic actuator is known from U.S. Pat. No. 6,648,371 B2. In this case, the first end of a strap is connected to the throttle element and the second end of said strap is connected to a bolt of the actuator. The actuator in this case is held, in particular, on the housing bottom of the airbag module. As long as the actuator is not activated, the throttle element is thus connected via the strap to the housing bottom. If the airbag cover is fully expanded, then the strap moves into a tensioned state which holds the throttle element in its first state. If the actuator is operated, then the bolt which holds the second end of the pull element, is blasted off by a pyrotechnic charge, the pull element loses its tension and the throttle element changes to its second state, namely its unthrottled state. This technology basically functions very well; it has, however, the disadvantage that some parts, such as the bolt, for example, can fly around inside the gas compartment of the airbag cover, and that open flames are generated by the pyrotechnic charge inside the airbag cover. Furthermore, the pyrotechnic charge injects additional gas into the gas compartment of the airbag cover, which is not always desirable.

A throttle element in the form of a nozzle extending from a first to a second end is known from US 2006/0071461 A1. In this regard, the first end around the ventilation opening is secured to the cover of the airbag and the second end features a tunnel through which a first end of a strap extends. In the initial state, the second end of the strap is connected to an actuator, for example to one like that described above. In the initial state (hereinafter usually designated as the first state), the nozzle is located inside the gas compartment surrounding the cover of the airbag. If this airbag is filled by its associated inflator, which causes the airbag cover to expand, then the strap is subjected to tensile stress and pulls tight the second end of the nozzle, as a result of which the ventilation device formed by the ventilation opening and nozzle is throttled. If the actuator is now operated, so that the second end of the strap is released, then the nozzle is pulled outwardly through the ventilation opening due to the overpressure prevailing in the first gas compartment. The strap is now no longer under tensile stress and can no longer hold the second end of the nozzle, so that the ventilation device changes to an unthrottled, second state.

The generic specification WO2011/157631 A1 proposes an airbag module with an adaptive ventilation device in which a second, small airbag is disposed inside the gas compartment of the actual airbag cover and acts as a part of an actuator. The cover of this second airbag—hereinafter designated as the second cover—surrounds a second gas compartment which can be filled with gas by a gas generator in the form of an ignition capsule. If this occurs, then this influences the free cross-section of the ventilation opening. In the embodiment known from WO2011/157631 A1, the second cover is sewn at least in sections around the ventilation opening together with the first cover by means of a tear seam. This means that, in the initial state, the second cover covers the ventilation opening and thus seals it. When the second cover expands, this tear seam tears apart and the ventilation opening is released. The second cover in this case has a dual function: Firstly, it serves as a part of the actuator, and secondly, as a part of the throttle device, namely as throttle element. The disadvantage of the described system is that the tear seam must withstand the forces acting on the second cover used as a cover element due to the internal pressure occurring in the first gas compartment, but otherwise must break apart owing to the forces occurring as a result of filling the second cover. This is difficult to adjust.

Proceeding from this point, the object of the present invention is to improve a generic airbag module such that it can be reliably ensured with simple means that the tear seam remains intact as long as the second cover is not filled with gas and breaks apart when the second cover is filled with gas.

This object is attained by an airbag module as described herein.

SUMMARY AND INTRODUCTORY DESCRIPTION OF THE INVENTION

According to the present invention, the ventilation opening is directly throttled without the second cover in the first state, that is, in particular, it is closed by means of the tear seam. This is attained in that the tear seam extends not only through the two layers of the second cover, but also through two sections of the border surrounding the ventilation opening. Thus, the ventilation opening is pulled tight by the tear seam in the first state. The second cover no longer has a dual function (as a throttle element and as a part of the actuation unit), but solely acts as a part of the actuator. As a result of this, a very high degree of freedom is given in the design of the ventilation opening and of the tear seam, which can be used—as will be shown below—to keep low the forces acting on the tear seam due to the internal pressure in the first gas compartment. The obtained freedom of design, however, yet has additional advantages, in particular, with regard to the configuration of the second cover.

In a first, preferred embodiment, the adaptive ventilation device features a nozzle extending from a first end to a second end, wherein the first end of the nozzle is firmly connected, in particular sewn, to the first cover around a through opening of the first cover, and wherein the second end of the nozzle features the ventilation opening so that the nozzle forms the border of the ventilation opening. In this embodiment, the force acting on the tear seam due to the internal pressure in the first gas compartment can virtually be reduced to zero. In its first state, the nozzle can be disposed inside or outside the first gas compartment.

In a second, preferred embodiment, the ventilation opening is located directly in the first cover and the tear seam seals this ventilation opening in that it pulls tight the edge of the ventilation opening. In this case, the ventilation opening can have any shape; it can, in particular, be formed by a straight or curved slit, or can have a two-dimensional configuration. The selected geometry, among other things, has an influence on how high the forces acting on the tear seam due to the internal pressure in the first gas compartment are.

In order not to require any additional installation space and to ensure that the second cover can easily expand completely, the second cover can be disposed entirely inside the gas compartment enclosed by the first airbag cover. It is, however, also possible to dispose the second cover entirely outside the gas compartment enclosed by the first airbag cover.

It is possible to design the second cover so that it remains entirely closed even after having been filled, as well as it is possible to design it so that it opens when being filled. Both designs have advantages depending on the specific circumstances.

The second cover can be entirely separate from the first cover, or it can coincide with it in sections.

BRIEF DESCRIPTION OF THE DRAWINGS

The invention will now be explained by means of preferred embodiments, with reference to the figures. The figures show:

FIG. 4 is an adaptive ventilation device and an actuator unit, which is similar to that shown in FIGS. 1 to 3, in a state corresponding to FIG. 2;

FIG. 4a is a schematic top view from the direction R1 in FIG. 4;

FIG. 4b is a perspective view of what is shown in FIG. 4a, wherein the viewing point is inside the first gas compartment;

FIG. 5 shows the adaptive ventilation device and the actuator from FIG. 4 in a state corresponding to FIG. 3;

FIG. 5a is a perspective view of the adaptive ventilation device from FIG. 5, wherein the viewing point is outside the first gas compartment;

FIG. 12 is a fifth embodiment in a state corresponding to FIG. 4;

FIG. 13 what is shown in FIG. 12 in a state corresponding to FIG. 5;

FIG. 18 is a view of an eighth embodiment of the invention;

FIG. 18a is a schematic top view from the direction R2 in FIG. 18;

FIG. 18b is a perspective view of what is shown in FIG. 18a, wherein the viewing point is inside the first gas compartment;

FIG. 19 is the adaptive ventilation device and the actuator from FIG. 18 in a state corresponding to FIG. 5;

FIG. 19a is a perspective view of the adaptive ventilation device from FIG. 19, wherein the viewing point is outside the first gas compartment;

FURTHER DESCRIPTION OF THE INVENTION

A first embodiment of the invention will now be described in detail by means of a first exemplary embodiment with reference to FIGS. 1 to 5a. Although there are differences between the version shown in FIGS. 1 to 3, and the version shown in FIGS. 4 and 5 with respect to the housing of the actuator unit, since this has no influence on the mode of operation and, in this case, the essential geometry, both versions will be regarded as belonging to the first exemplary example and reference will made to all the named figures.

Figure 1:
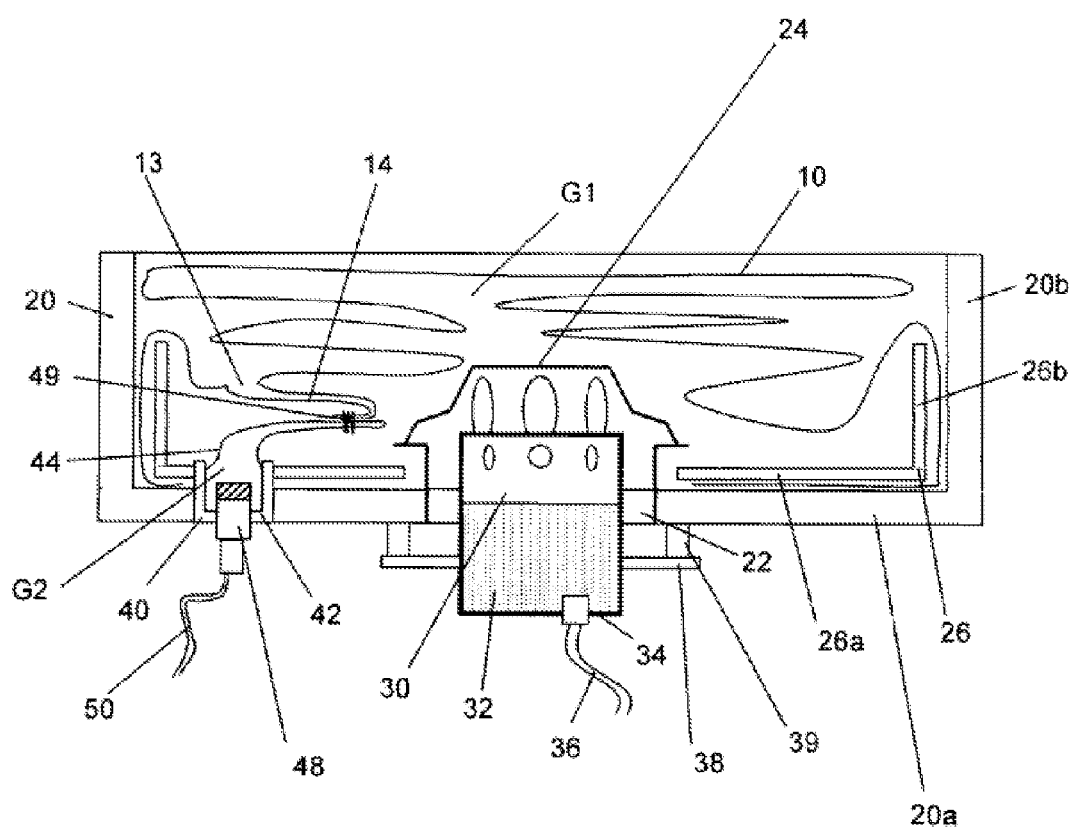
FIG. 1 is a schematic, cross-sectional view of a first embodiment of an airbag module according to the invention in the idle state.
Figure 2:
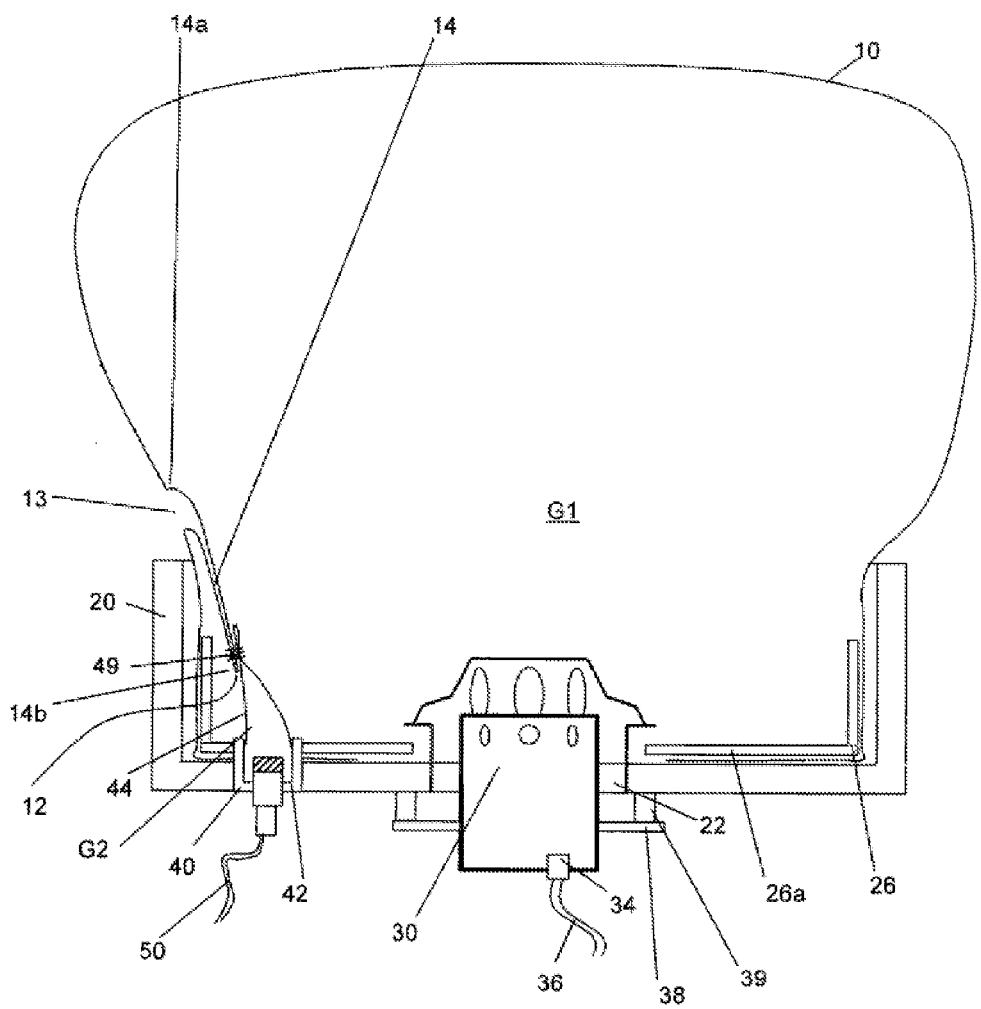
FIG. 2 what is shown in FIG. 1, after the ignition of the gas generator and filling of the first gas compartment, which is enclosed by the airbag cover—designated here as first cover—but wherein the ventilation device is still in a throttled state.
Figure 3:
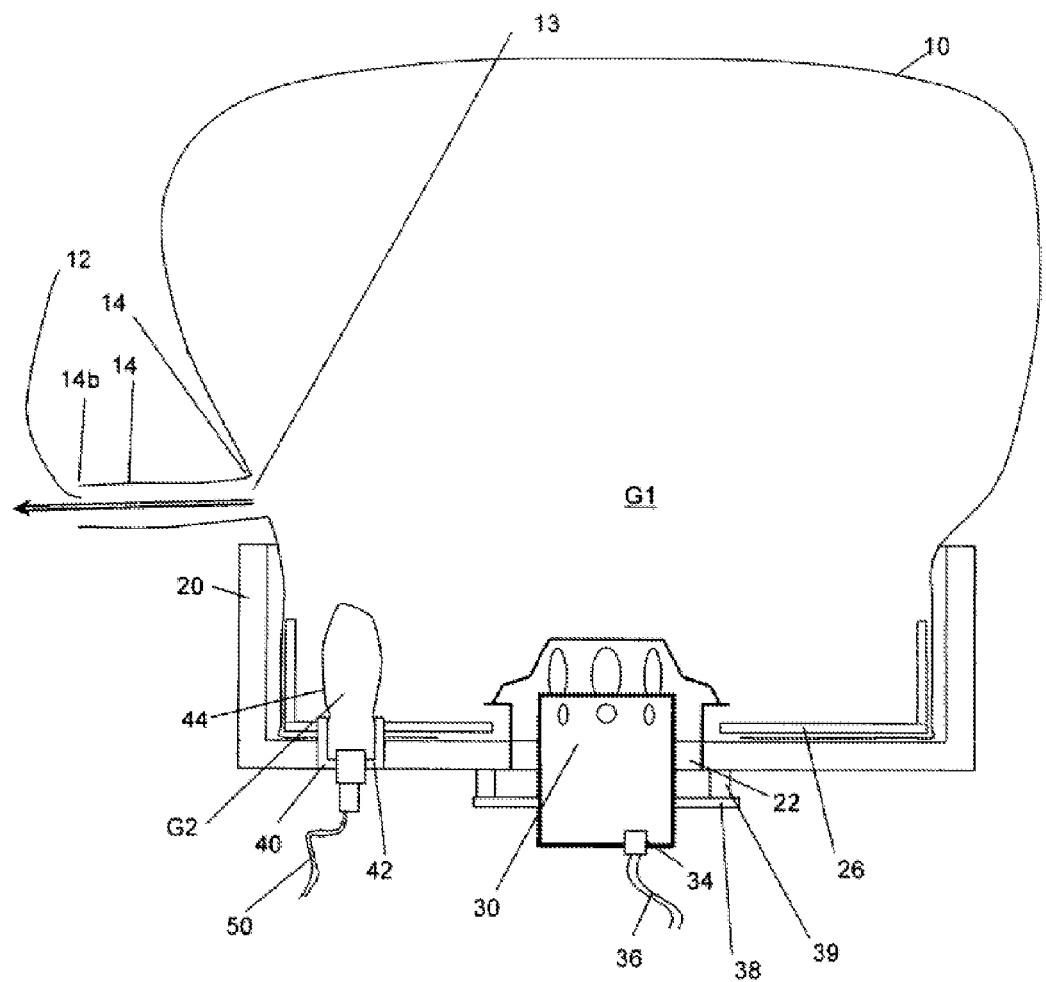
FIG. 3 what is shown in FIG. 2 after the activation of an actuator unit, as a result of which the ventilation device has changed to an unthrottled state.

FIGS. 1 to 3 display a front airbag module, namely a driver's airbag module for installation in the hub region of a steering wheel. Basically, it has the usual design: It namely has a housing 20 with a housing wall 20b and a housing bottom 20a into which, the airbag cover designated as the first cover 10 is folded when in the idle state. This first cover 10 encloses a first gas compartment G1. The first cover 10 is held on the housing bottom 20a by a retaining and deflector element 26, for which purpose the retaining and deflector element 26 features a bottom 26a from which a perimeter side wall 26b furthermore extends. A first inflator is used, namely a gas generator 30, in order to fill the first gas compartment, which inflator in the shown embodiment extends through an opening 22 in the housing bottom 20a and through a hole in the bottom of the retaining and deflector element 26 into the interior of the housing 20, and thus into the first gas compartment G1. This gas generator 30, in the usual manner, has a propelling charge 32 which is ignited by a first ignition capsule 34 as soon as it is electrically triggered via an ignition cable 36. There are outlet openings for the generated gas in the upper region of the gas generator 30; this region of the gas generator 30 is covered by a diffusor 24. In the shown embodiment, the gas generator 30 and the housing bottom 20a are connected by means of a flange 38 of the gas generator and damper 39.

An adaptive ventilation device is provided on the first cover 10, through which the first gas compartment G1 can be vented. A second, in particular a non-adaptive ventilation device can be provided, in particular in the form of a perforation in the first cover. This is, however, not shown. The adaptive ventilation device has a through opening 13 and a nozzle 14, whose first end 14a around the through opening 13 is connected to the first cover 10 by a permanent connecting seam. This permanent connecting seam, however, is only shown in FIG. 4b in which it is designated with the reference numeral 16. The second end of the nozzle 14 encloses the ventilation opening 12 and forms its border.

The adaptive ventilation device just described above is closed, or at least throttled, in the initial state and can be changed to an unthrottled, second state at an external (usually electrical) signal. The actuator unit 40 is used for this purpose. Said actuator unit has a second cover 44 and a second ignition capsule 48 as its essential elements. When the second ignition capsule 48 is actuated—by means of the ignition cable 50 of the second ignition capsule—the second gas compartment G2 enclosed by the second cover is filled with gas.

In the exemplary embodiment shown in FIG. 1, the second ignition capsule 48 is accommodated in a second housing 42, so that the actuator unit 40 is configured "like a small airbag module." As will, however, be shown below, the provision of a "real" second housing 42 is not absolutely necessary. Furthermore, it is not absolutely necessary that the gas source for filling a second gas compartment G2 (in this case, the second ignition capsule 48) be located directly in the second gas compartment G2. An inlet via a gas inlet element or the like would be equally possible, but is not shown in the figures. In the initial state of the adaptive ventilation device, the nozzle 14 is sewn via a tear seam 49 to the second cover 44, so that the ventilation opening 12 is wholly or partially sealed. Due to this seam, both the second cover 44 and the nozzle 14 at least in sections have two defined layers, wherein the two layers of the second cover are designated with the reference numerals 44a and 44b, and the two layers of the nozzle 14 form two sections of the border of the ventilation opening 12. In the shown state the nozzle 14 thus extends from a first end 14a, that is, essentially from the through opening 13, in the direction of the second cover 44, being sewn by means of the second tear seam 49 preferably in the vicinity of the second end 14b of the nozzle 14. If the tear seam 49 extends over the entire width of the nozzle 12, then the adaptive ventilation device is entirely sealed, that is, there is a one-hundred percent throttling.

Now, if the second ignition capsule 48 is actuated via its ignition cable 50, then it fills the second gas compartment G2 with gas, so that the two layers 44a, 44b of the second cover 44 are pushed away from each other due to the prevailing gas pressure, which causes a rupture of the tear seam 49. Due to this rupture of the tear seam 49, both the second end 14b of the nozzle 14 is released from the second cover 44 and the connection of the two layers of the nozzle 14 is opened. If the first gas compartment G1 is filled with gas after the just described release of the second end 14b of the nozzle 14, or if it has already been filled with gas upon release of the second end 14b of the nozzle 14 (as is shown in FIGS. 3 and 4), then the nozzle 14 is turned outwardly through the through opening 13 owing to the overpressure prevailing in the first gas compartment G1, and gas can flow out through the through opening 13 from the first gas compartment G1 via the nozzle 14 through the ventilation opening 12.

FIGS. 4 to 5a again show the just explained exemplary embodiment, but in detailed views. The second housing 42 is configured somewhat differently here than in the version of FIGS. 1 to 3; here it namely shows only a portion of the second ignition capsule 48.

Figures 6, 7:
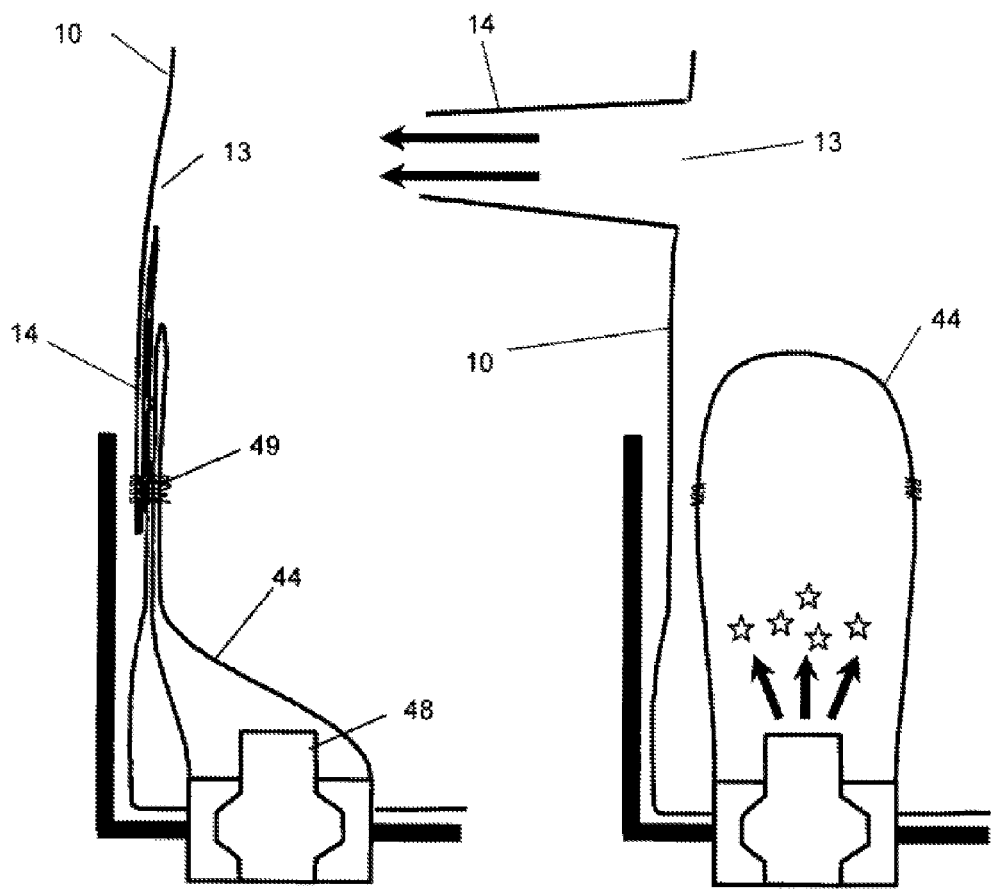
FIG. 6 is a second embodiment in a state corresponding to FIG. 4.
FIG. 7 what is shown in FIG. 6 in a state corresponding to FIG. 5.

In the first exemplary embodiment just described above both the nozzle 14 and also the second cover 44 are disposed inside of the first gas compartment G1 in a first state (initial state). This is, however, not absolutely necessary, as is evident from the examples shown in FIGS. 6 to 11. In the second exemplary embodiment of FIGS. 6 and 7, the second cover 44 is disposed inside the first gas compartment G1, but the nozzle 14 is outside in each state. Here, the nozzle 14 and the second cover 44 are sewn together by means of the tear seam 49 through the first cover 10. The arrangement of nozzle 14 outside the first cover 10 has the advantage that the nozzle 14 need not be first pulled through the ventilation opening 12 after its release. Thus, the adaptive ventilation device becomes very fast. It must, however, be ensured that the tear seam 49 withstands the maximum gas pressure in the first gas compartment G1, since it can be acted on with that pressure.

Figures 8, 9:
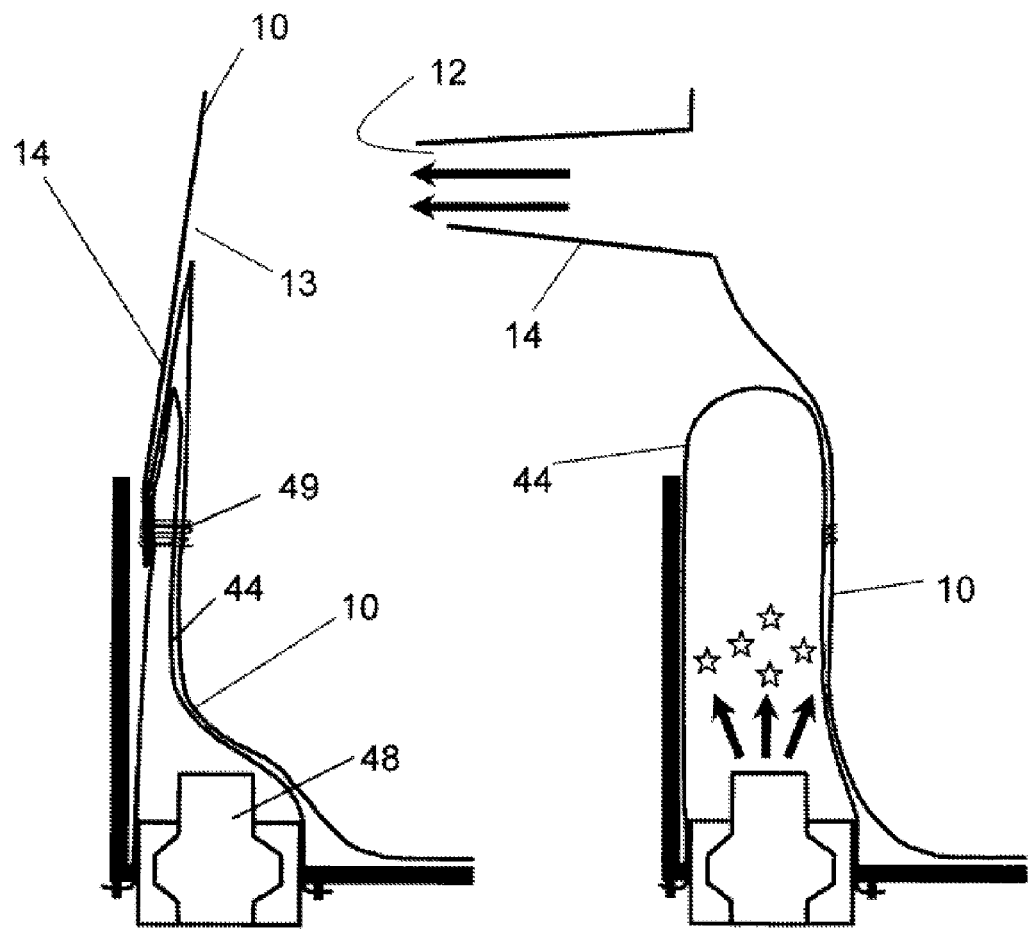
FIG. 8 is a third embodiment in a state corresponding to FIG. 4.
FIG. 9 what is shown in FIG. 8 in a state corresponding to FIG. 5.

As is apparent from the third exemplary embodiment of FIGS. 8 and 9, it is also possible to arrange both the nozzle 14 and the second cover 44 outside the first gas compartment G1. In this case, the tear seam 49 can extend through the layers of the nozzle 14 and the layers of the second cover 44 and also through the first cover 10 in order to secure the nozzle 14 and the second cover 44 on the first cover 10. However, this is not absolutely necessary for the functional operation of the adaptive ventilation device.

Figures 10, 11:
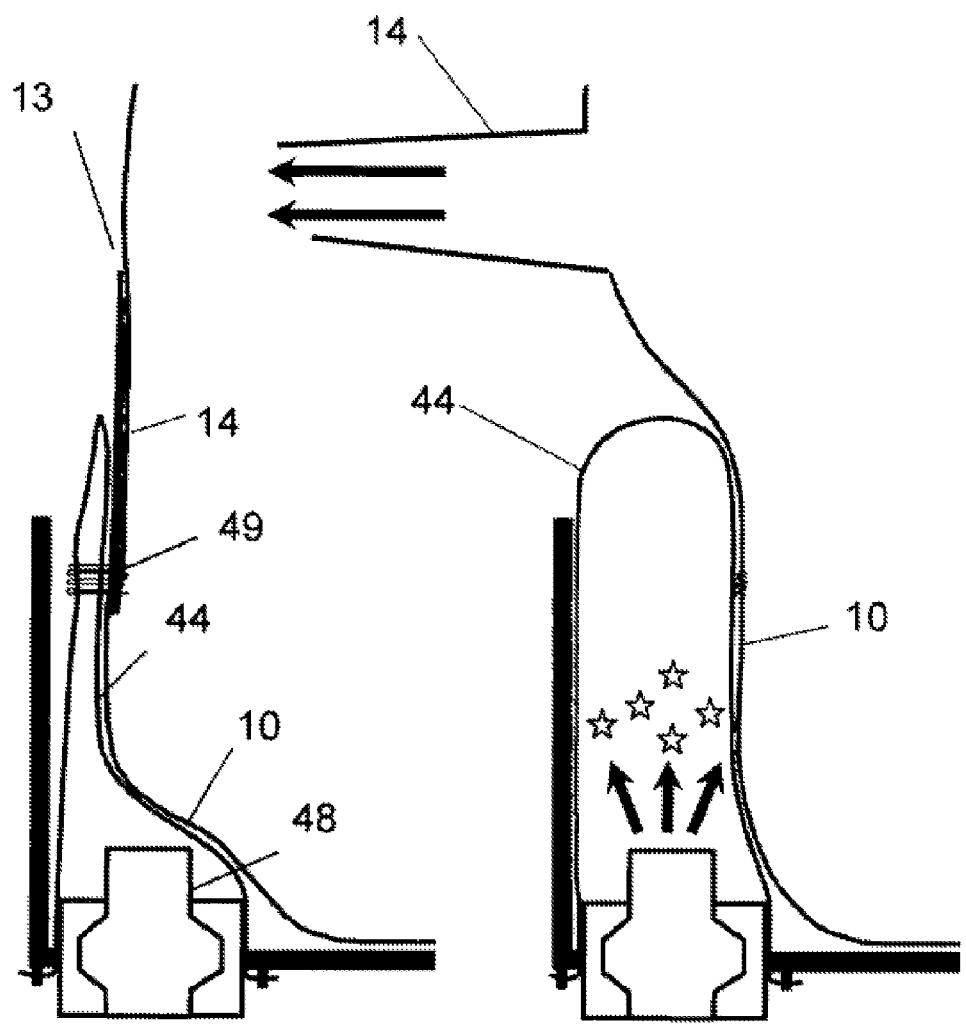
FIG. 10 is a fourth embodiment in a state corresponding to FIG. 4.
FIG. 11 what is shown in FIG. 10 in a state corresponding to FIG. 5.
Figures 14, 15:
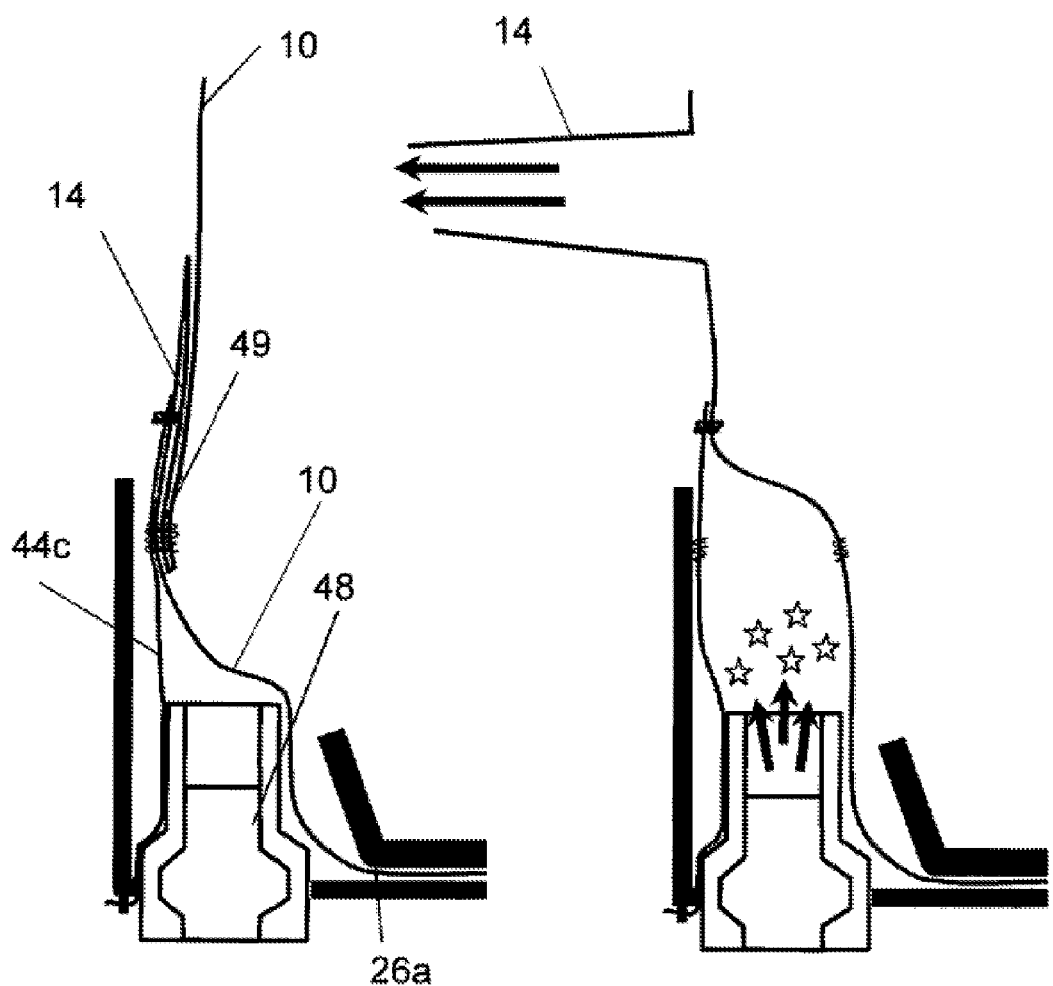
FIG. 14 is a sixth embodiment in a state corresponding to FIG. 4.
FIG. 15 what is shown in FIG. 14 in a state corresponding to FIG. 5.

In the initial state, it is also possible to dispose the nozzle 14 inside the first gas compartment G1, the second cover 44, however, on the outside, as a kind of reverse second exemplary embodiment. This is shown in FIGS. 10 and 11. In the exemplary embodiments shown heretofore, the first cover 10 and the second cover 44 are fully separated from each other. As shown in the fifth exemplary embodiment of FIGS. 12 and 13, this is, however, not absolutely necessary. It is namely possible that the first cover 10 and the second cover 44 coincide in sections, that is, that one section of the first cover 10 will also form a section of the second cover 44. This means that in addition to the first cover 10, there is merely another layer of the second cover; this additional layer is designated with the reference numeral 44c. As is shown in FIGS. 12 and 13, this additional layer can be located outside the first cover 10, or even inside, but this is not shown in the Figures. In the exemplary embodiments, in which the first cover 10 and the second cover 44 coincide in sections, it is both possible, in the first state, to arrange the nozzle 14 outside the first gas compartment (FIGS. 12 and 13) and also inside it (FIGS. 14 and 15).

Figures 16, 17:
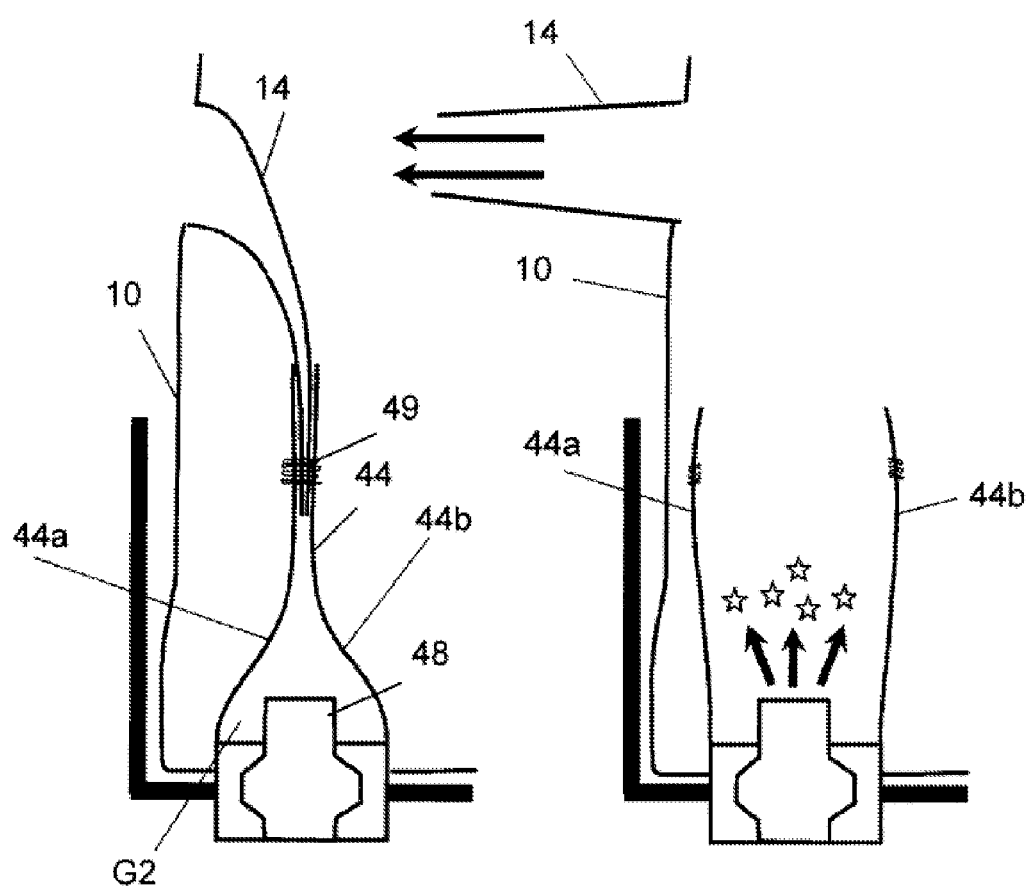
FIG. 16 is a seventh embodiment in a state corresponding to FIG. 4.
FIG. 17 what is shown in FIG. 16 in a state corresponding to FIG. 5.

In the exemplary embodiments shown above, the second cover 44 remains closed after the ignition of the second ignition capsule 48, so that no gas of the second ignition capsule escapes to the first gas compartment G1 or to the outside. This can have advantages, but is not absolutely necessary, as is shown in the seventh exemplary embodiment of FIGS. 16 and 17. In particular, it is possible that the second cover 44 consists of two separate layers, which in the initial state are connected to each other via the tear seam 49. Upon rupture of the tear seam 49, the second gas compartment opens, as is shown in FIG. 17. In this embodiment, it is also possible that, in the initial state, the nozzle 14 is disposed between the two layers 14a, 14b of the second cover. Even with an opening second cover, it is quite possible that it will be located outside the first gas compartment G1, and it is equally possible that the first and second covers will coincide in sections. All conceivable variants, however, are not shown in the figures.

Which of the numerous variants will be used in a specific application will depend on a plurality of factors, in particular on the geometric conditions (also those of the first housing), on the required response times etc. In consequence, it is not possible to speak of a best or of a generally preferred embodiment.

Figure 20:
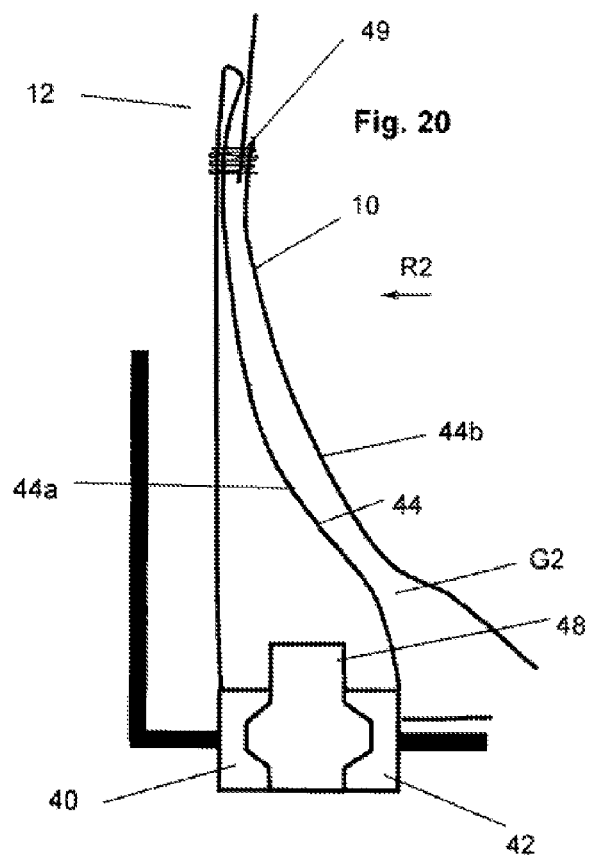
FIG. 20 is a view of a ninth embodiment corresponding to FIG. 18.
Figure 21:
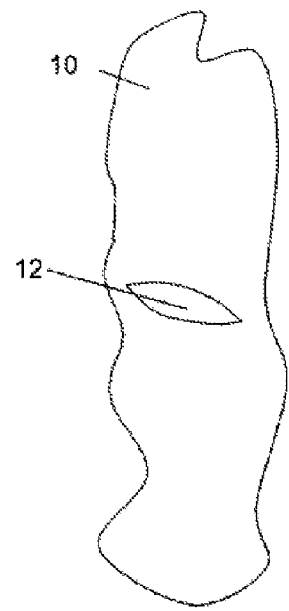
FIG. 21 is a view of an alternative geometric shape of the ventilation opening of a tenth embodiment of the invention.
Figure 22:
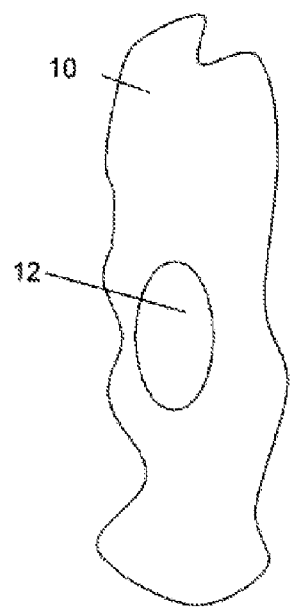
FIG. 22 is a view of another alternative geometric shape of the ventilation opening corresponding to FIG. 21.

Additional embodiments of the invention will now be explained with reference to FIGS. 18 to 22, wherein FIGS. 18 to 19a show an eighth embodiment, FIG. 20 shows a ninth embodiment and FIGS. 21 and 22 show alternative geometric forms of the ventilation opening in accordance with a tenth embodiment.

The eighth through the tenth embodiment of the invention do not have a nozzle; here, the ventilation opening 12 is located directly in the first cover 10. Since the tear seam 49, of course, at least also partly closes the ventilation opening 12 here, that is, a first section of the border of the ventilation opening connects to a second section of the border of the ventilation opening, the first cover is thus pulled tight somewhat in sections, since the border of the ventilation opening belongs to the first cover 10. The tear seam thus extends through two layers of the first cover 10 and two layers of the second cover 44.

In the eighth embodiment, as is shown in FIGS. 18 to 19a, the ventilation opening is configured as a slit having a U- or a V-shape, as is in particular apparent from FIGS. 18a and 18b. In this way, a flap 15 is formed, which flap 15 is folded out upon rupture of the tear seam 49 due to the internal pressure prevailing in the first gas compartment G1, as is shown in FIG. 19a. In the first exemplary compartment, the second cover 44 is disposed inside the first gas compartment G1; however, in this embodiment it is also possible to arrange the second cover 44 outside the first gas compartment G1, as is shown in the ninth exemplary embodiment shown in FIG. 20. This has the advantage, in particular, that an inadvertent covering of the ventilation opening 12 after the expansion of the second cover 44 will be prevented.

In the eighth through the tenth embodiments, it would also be possible that the first cover and the second cover coincide in sections, corresponding to the exemplary embodiments shown in FIGS. 12 to 15. A second cover opening upon actuation of the second ignition capsule 48 is likewise possible.

FIGS. 21 and 22 show alternative embodiments of the ventilation opening 12 that can be configured, in particular, as a straight, or as a two-dimensional, in particular, as a circular, slit.

The forces which act on the tear seam 49 when the first gas compartment G1 is filled, strongly depend on the geometric configuration of the ventilation opening 12, wherein the forces in general are the lowest when the ventilation opening 12 is configured as a straight slit.

eighth through the tenth embodiments in comparison to the prior embodiments is, in particular, the lower expenditure on materials and manufacturing (a nozzle is not required); however, the first through the seventh embodiments in general have the advantage that it provides an even greater range of design possibilities and that it is easily possible to reduce the forces acting on the tear seam 49 to about zero when the first gas compartment G1 is filled.

While the above description constitutes the preferred embodiment of the present invention, it will be appreciated that the invention is susceptible to modification, variation and change without departing from the proper scope and fair meaning of the accompanying claims.

The invention claimed is:

1. An airbag module comprising;
 a first cover enclosing a first gas compartment, a first inflator for filling the first gas compartment, at least one adaptive ventilation device for the ventilation of the first gas compartment which features at least one ventilation opening bordered by flexible material and at least one throttle device having a tear seam, which, in a first state, throttles the gas flow through the ventilation opening more strongly than in a second state,
 a second cover surrounding a second gas compartment and a gas source for filling the second gas compartment, wherein the tear seam extends through the second gas compartment, and upon filling of the second gas compartment by the gas source, the seam ruptures so that the adaptive ventilation device changes from a first, throttled state to a second, less throttled state,
 the tear seam throttles the ventilation opening in the first state of the adaptive ventilation device at least in that the tear seam connects a first section of a border of the ventilation opening directly to a second section of the border of the ventilation opening and pulls tight the border at least in first and second sections,
 wherein the gas source is a second inflator independent of the first inflator.

2. The airbag module according to claim 1, further comprising in that the ventilation device features a nozzle extending from a first end to a second end, wherein the first end of the nozzle is firmly connected and sewn to the first cover around a through opening of the first cover, and wherein the second end of the nozzle features the ventilation opening so that the nozzle forms the border of the ventilation opening.

3. The airbag module according to claim 2, further comprising in that, in the first state, the nozzle is located inside the first gas compartment.

4. The airbag module according to claim 2, further comprising in that, in the first state, the nozzle is located outside the first gas compartment.

5. The airbag module according to claim 1, further comprising in that the ventilation opening is an opening in the first cover, so that the border of the ventilation opening is formed by the first cover.

6. The airbag module according to claim 5, further comprising in that the ventilation opening is configured slot-shaped.

7. The airbag module according to claim 6, further comprising in that the ventilation opening is configured U-shaped.

8. The airbag module according to claim 5, further comprising in that the ventilation opening has a planar, circular or oval configuration.

9. An airbag module according to claim 1 further comprising in that the second cover is disposed entirely inside the first gas compartment.

10. An airbag module according to claim 1 further comprising in that the second cover is disposed entirely outside the first gas compartment.

11. An airbag module according to claim 1 further comprising in that the second cover remains closed even after filling the second gas compartment.

12. An airbag module according to claim 1 further comprising in that the second cover opens upon filling the second gas compartment.

13. An airbag module according to claim 1 further comprising in that the ventilation opening is fully closed in the first state.

14. An airbag module according to claim 1 further comprising wherein the first gas compartment and the second gas compartment are separate in that the first cover does not form any portion of the second gas compartment, and the second cover does not form any portion of the first gas compartment.

15. An airbag module according to claim 1 further comprising wherein a portion of the first cover further encloses portions of the first gas compartment and the second gas compartment.

* * * * *